United States Patent [19]

Flammer, III et al.

[11] Patent Number: 5,515,369
[45] Date of Patent: May 7, 1996

[54] METHOD FOR FREQUENCY SHARING AND FREQUENCY PUNCHOUT IN FREQUENCY HOPPING COMMUNICATIONS NETWORK

[75] Inventors: George H. Flammer, III, Cupertino; Brett D. Galloway, Campbell; David L. Paulsen, Mountain View, all of Calif.

[73] Assignee: Metricom, Inc., Los Gatos, Calif.

[21] Appl. No.: 265,096

[22] Filed: Jun. 24, 1994

[51] Int. Cl.⁶ .................................................. H04J 1/14
[52] U.S. Cl. .......................... 370/69.1; 370/76; 375/285
[58] Field of Search ................................ 370/95.1, 95.2,
370/95.3, 69.1, 76, 70, 50, 94.1, 77, 18;
375/202, 200, 203, 208, 285; 455/61, 62,
63, 69, 70, 71, 138, 166.1

[56] References Cited

U.S. PATENT DOCUMENTS

| | | |
|---|---|---|
| 4,554,668 | 11/1985 | Deman et al. .................... 375/202 |
| 5,007,052 | 4/1991 | Flammer . | |
| 5,079,768 | 1/1992 | Flammer . | |
| 5,115,433 | 5/1992 | Baran et al. . | |
| 5,361,401 | 1/1994 | Pirillo ............................... 455/62 |

Primary Examiner—Melvin Marcelo
Assistant Examiner—Huy D. Vu
Attorney, Agent, or Firm—Townsend and Townsend and Crew; Kenneth R. Allen; Stephen J. LeBlanc

[57] ABSTRACT

In a wireless packet communication system having a plurality of nodes, each having a transmitter and a receiver, the receiver at each node is assigned a seed value and is provided with a channel punchout mask. A node uses its seed value and punchout mask to generate a specific randomly ordered channel hopping band plan on which to receive signals. A node transmits its seed value and punchout mask to target nodes with which it wants to establish communication links, and those target nodes each use the seed value and punchout mask to generate the randomly ordered channel hopping band plan for that node. Subsequently, when one of the target nodes wish to transmit to the node, the target node changes frequency to the frequency of the node according to that node's band plan.

10 Claims, 2 Drawing Sheets

METHOD FOR FREQUENCY SHARING AND FREQUENCY PUNCHOUT IN FREQUENCY HOPPING COMMUNICATIONS NETWORK

BACKGROUND OF THE INVENTION

The invention relates generally to the field of data communication. More particularly, this invention relates to a technique for establishing a channel band plan for a node in a communication network that utilizes multi-channel hopping. This invention has particular application to packet communication radio mesh networks using frequency hopping.

Packet communication networks provide for the transfer of data packets between various remote locations herein referred to as nodes. Nodes are equipped with transmitters and receivers that can transmit data over a medium, which may be radio waves, fiber optic cable, wire, etc. In order to accomplish successful data transfer, each node must operate in accordance with a protocol determining when it may transfer on the medium, for how long, and, in a multiple channel network, on what channel. Additional protocol tasks include error checking and error correction. Various network protocols and network topologies are discussed in earlier related patents in this field owned by the assignees of the present invention, including U.S. Pat. Nos. 5,115,433; 5,007, 052; and other patents mentioned below.

U.S. Pat. No. 5,079,768 (Flammer et. al) issued to one of the inventors of the present invention, describes a peer-to-peer frequency-hopping radio-based communication network in which every receiver node is assigned a different starting point or home slot in a frequency hopping pattern. The frequency-hopping pattern is a randomized ordered list of all the channels available to nodes in the network. The channel order is shared by all the nodes in the network, but contention is reduced by having each node start its channel hopping at a different channel in the list. Transmitters wishing to transmit to a receiver node must switch to that receiver's current frequency in the hopping pattern to transmit a poll packet. The transmitter first listens at the assigned frequency of the receiver to determine if there is any traffic at that frequency. If there is traffic at that frequency, the transmitter waits an interval and the transmitter and receiver both hop to the next frequency in the pattern and the transmitter listens again. Once a frequency is found with no traffic, the transmitter sends a poll packet, and when that poll packet is acknowledged, the transmitter sends a data packet before the hop to the next frequency. In a particular embodiment of this network, frequency hopping occurs once every second.

As discussed the '768 patent, communication on certain frequencies may be restricted in duration in accordance with frequency allocation and bandwidth utilization rules and requirements. Such restrictions may be imposed by a licensing authority, such as the U.S. Federal Communications Commission (FCC). For example, in the 902–928 MHz frequency band, the FCC has proposed a rule that continuous transmission by a single transmitter of no more than 1 watt rf output power on any one channel be of no more than 400 ms duration each 30 seconds, and that at least some if not all other channels be selected prior to retransmission on the same frequency (FCC Rules, Part 15.247). Communication between any given pair of transceivers on a single frequency is thus restricted to packets of information which can be communicated in less than 400 ms, and means must be provided to accommodate communication on other frequencies.

Related co-pending U.S. patent application Ser. No. 08/193,338, claims improvements to the frequency-hopping communication network of Flammer. According to the invention disclosed in that application, when a target node returns an acknowledgement, the target node reserves access to itself for the polling station at a preselected time for a preselected duration on a specified frequency channel that is different from its assigned channel according the band plan. The source node then transmits its data packet on the target node's data receive channel and waits for an acknowledgement on the same receive channel. The source node and the target node exchange information on the same channel throughout the interchange, even though the assigned receive channel of the target node according to the frequency-hopping band plan may have changed in the meantime. With this improvement, collisions between the data packet and other acquisition packets directed to that target node are avoided because all other nodes will direct poll packets to the target at the frequency according to the target's band plan, while the target remains at the data exchange frequency.

Performance of the network described in the '768 patent is limited in two respects. One is due to collisions that may arise when two nodes happen to start out at the same home slot. With the identical frequency-hopping pattern shared by all nodes in the network, two nodes that start out at the same home slot frequency will always hop together and remain on the same frequency. In a specific embodiment of the network described in the '768 patent, there were just 205 channels available. In a mesh network with a large number of nodes, having two nodes share the same starting frequency is a not unlikely occurrence. According to the network protocol, when a collision occurred, the transmitting nodes wait and retransmit at a subsequent frequency hop. If two nodes where hopping on the same band plan, and one node was very busy, an appreciable number of data packets would be lost and would need to be repeatedly transmitted due to repeated collisions.

A second factor limiting performance in the Flammer network is that the fixed frequency hopping sequence did not allow transmitters to skip channels on which the receivers could not receive data. This problem is particularly acute when nodes are located in possibly disparate locations throughout a geographic area. Since these nodes operate in the radio frequency spectrum, they are dependent upon it for the propagation of the data carrying signals between the nodes. At each particular location, the frequency spectra can have a unique level and pattern of spectral occupancy. Optimum network performance would dictate that those channels that cannot support robust communication at the time not be "bothered with"; unusable frequencies should be seemlessly eliminated, newly useable frequencies should be seemlessly integrated into the frequencies carrying data traffic. However, in the network disclosed in the '768 patent, all nodes were required to hop through all the available channels in the network, even if a particular node could not receive data on that channel.

What is needed is a network with a low-cost, reliable mechanism for establishing a unique channel hopping band plan for each node and that allows individualized seamless elimination of inoperable channels from a particular node's band plan.

SUMMARY OF THE INVENTION

In accordance with the invention, a frequency-hopping packet communication network establishes a unique frequency hopping band plan for every receiver in the network. A transmitter establishes synchronization with a target node by receiving from that target a seed value useable by a pseudo-random number generator to determine a frequency-hopping band plan for that target node. In a specific embodiment, the transmitter also receives a "punchout" mask from the target indicating channels to be deleted from the target's band plan. Each node establishes a link table of receiver frequency hopping band plans of each other node in the network within its communication range and uses that table for subsequent transmissions. It is the responsibility of the transmitting node to follow the pre-established frequency-hopping pattern for an immediate target receiver based on information the node has previously acquired in its link table. The frequency-hopping band plan, involving the number of channels and the pseudo-random pattern of frequency change and nominal timing of changes, is universally known to each node in the network. The details and operation of the invention will be better understood by reference to the following description of specific embodiments in connection with the accompanying drawings.

DESCRIPTION OF SPECIFIC EMBODIMENTS

Figure 1:
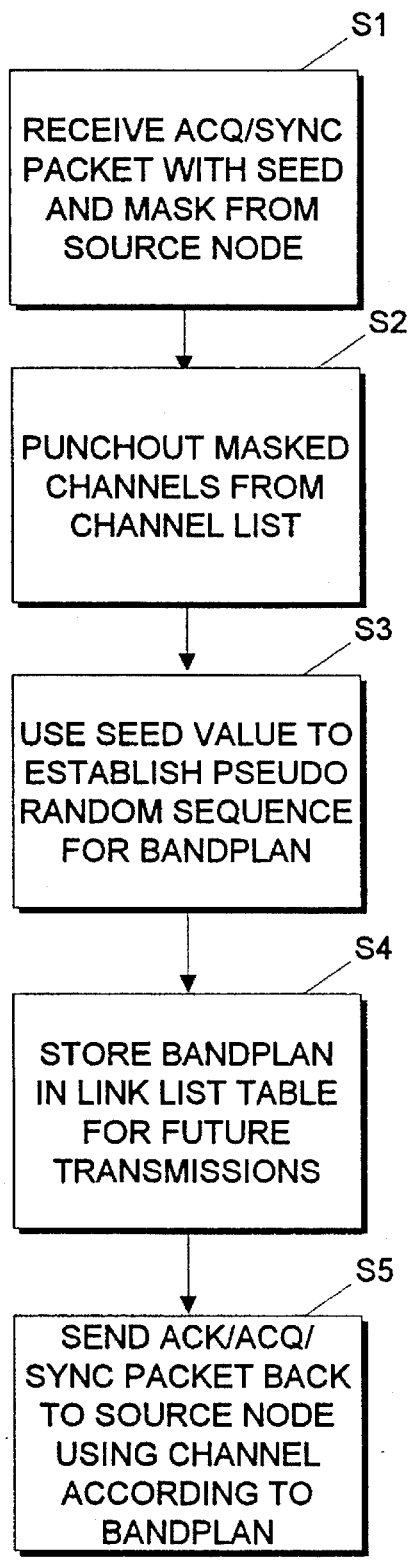
FIG. 1 is a flowchart illustrating how a table entry at a transmitter node is established when that transmitter receives a acquisition packet from a node.

FIG. 1 depicts a flow chart illustrating one step in the establishment of a network connection according to the invention. In one specific embodiment of a network built according to the invention, a node on power up initially has no information about other nodes in the network. The node, when initialized on power-up, knows what channels are available for data transmission on the network, knows the network timing protocol, and has a pseudo-random number generator that it can use to establish its own and other nodes' channel hopping band plans. When initialized, the node is provided with a local frequency punchout mask indicating channels on which it cannot receive or transmit data.

Once a node is turned on, in order to become operational in the network it must acquire network links by transmitting acquisition/synchronization packets on various network channels to any nodes that can hear the transmission. FIG. 1 is a flow chart illustrating the steps a responding target node takes in establishing a network link when it receives an acquisition/synchronization packet. A network connection is established when a target node receives an acquisition/synchronization packet from a source node (Step S1). The acquisition/synchronization packet contains information about the node, including a seed value for randomly ordering a channel list and a frequency punch out mask for eliminating channels from the channel list. The responding target node then constructs a subset of the network channel list by eliminating from the list those frequencies in the punchout mask on which the source node cannot transmit or receive data (Step S2). The responding node then uses the seed value from the source node in the acquisition/synchronization packet as a seed value in a pseudo-random number generator and generates a channel hopping band plan for the source node by ordering the channels according to the sequence from the pseudo-random number generator (Step S3). Once the target node has determined the frequency hopping band plan for the source node, it stores that information in its link list (Step S4). The responding node then switches to the source nodes channel according to the band plan and transmits an acknowledgement/acquisition/synchronization packet acknowledging to the source node that it has established a link and giving the source node its own seed value and punchout list so that the source node can determine the target node's band plan (Step S5).

Figure 2:
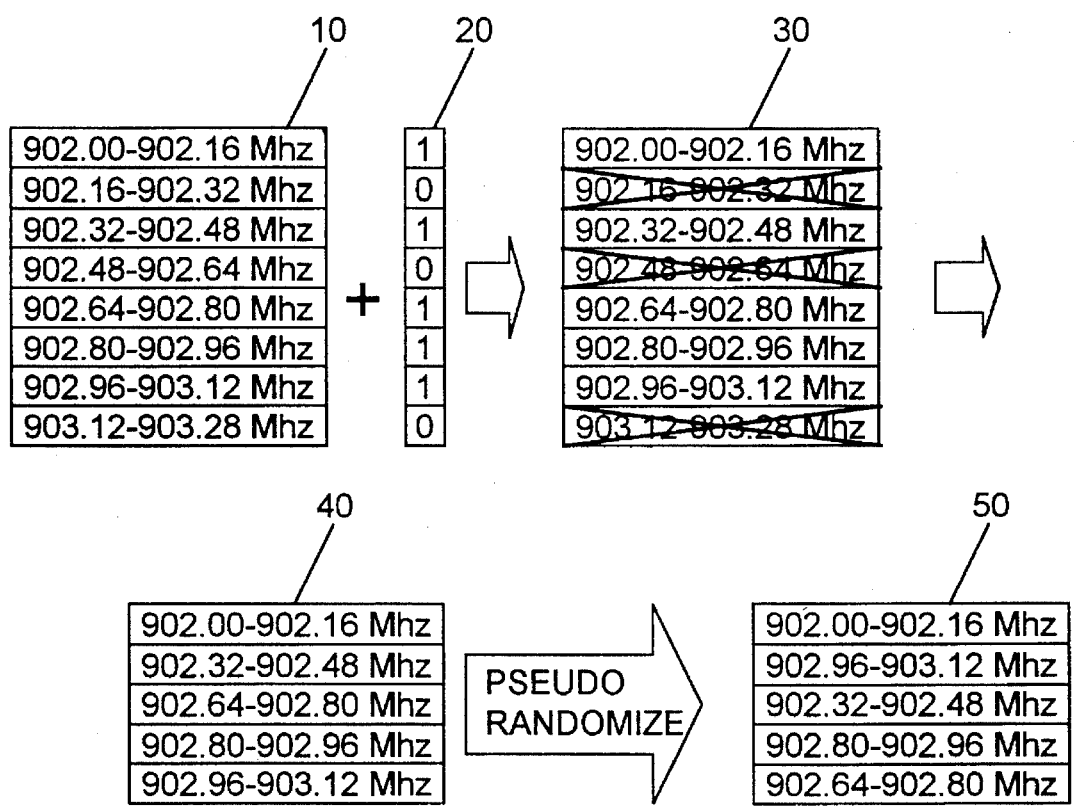
FIG. 2 is a diagram illustrating the generation of a randomized channel-hopping band plan according to the invention.

In a specific embodiment, a network according to the invention operates between the frequencies 902–928 Mhz with 162 channels that are 160 Khz wide. Nodes in the network transmit in their acquisition/synchronization packet a seed value that is one byte long, is derived from their node address, and is co-prime with the number of available channels. Nodes also transmit a punchout mask that is 21 bytes (168 bits) long. FIG. 2 illustrates the generation of a particular node's randomized frequency hopping band plan from a network channel list and a punchout mask according to the invention using, as an example, a network channel list 10 of eight 160 Khz channels ranging from 902 to 903.28 Mhz and, as an example, a punchout frequency mask 20 of eight bits. Network channel list 10 is a list in natural order of all the channels frequencies (in this example eight) available to nodes in the network. Frequency mask 20 is a mask received from an acquiring node indicating channels that are to be eliminated from the channel list, with a zero indicating channels to be eliminated and a one indicating channels used by the source node. A target node logically ANDS together channel list 10 with mask 20 to generate channel list 30 and then collapses the channel list by deleting unused channels to generate channel list 40, which lists the channels used by the target node in natural order. The target node then randomizes these remaining channels using a pseudo-random number generator seeded with the seed value of the source node to generate list 50, which is the channel hopping band plan for the source node.

A pseudo-random number generator is a well known apparatus for generating a "pseudo-random" sequence of numbers. The random number generator is referred as "pseudo" because the method used to generate the sequence is actually deterministic. It typically depends on a seed value used to begin the pseudo-random number generator and whenever an identical seed value is used, the random number generator will produce an identical pseudo-random sequence. In a network according to the invention, each node in the network includes a pseudo-random number generator of identical operation. The generators are designed to accept a seed value and a range value and generate a pseudo-random non-repeating sequence of integers in the given range. According to the invention, each node, therefore, can reproduce an arbitrary length pseudo-random non-repeating integer sequence given the seed value for that sequence and the desired range.

In the example illustrated in FIG. 2, the pseudo-random number generator is provided the seed value from the source node and is provided a range equal to the number of channels remaining in channel list 40 after punchout; in this example, five. The generator then generates the pseudo-random sequence 1, 5, 2, 4, 3 and this is used to construct table 50, with the first useable channel having the first position in the table, the fifth useable channel having the second position in the table, and so on.

The source node itself uses the process illustrated in FIG. 2 to construct its own channel hopping band plan from its seed value and punchout mask.

Once the nodes in a network built according to the invention have acquired link information about neighboring nodes with which they can communicate, the nodes may communicate packets according to any number of frequency-hopping network protocols, including those disclosed in the Baran patent and the patent application Ser. No. 08/193,338, discussed above. As discussed in those patents, during network operation, transmitters are responsible for following their targets frequency-hopping band plans with the difference that each node in a network according to the invention, will have a different randomized frequency-hopping band plan of a length that will varying for each node based on the number of channels that are punched out by that node's punchout mask. In a further embodiment of the invention, a source node uses its own punchout mask when transmitting to avoid transmitting on channels on which it cannot effectively transmit. If a target node is at such a channel, the source node simply waits until the next channel hop before transmitting to that target node.

Other, less effective methods for exchanging a unique frequency hopping band plan for each node will be apparent. A node could transmit its entire band plan with each acquisition packet, thus eliminating the need for transmitting a seed value or punchout mask. This, however, would be more expensive in terms of use of network resources for overhead than the present invention. Or a node could pass information organized in any number of different ways to indicate the order of its channel hopping and what channels it used. It will be seen, however, that given that each node must include a pseudo-random number generator to generate its own band plan, having nodes exchange just a seed value and 21 byte mask to fully specify a unique randomized subset of 162 channels provides maximum flexibility while using the least amount of network resources.

The invention has now been explained with reference to specific embodiments. Other embodiments will be apparent to those of ordinary skill in the art. It is therefore not intended that this invention be limited except as indicated by the appended claims.

What is claimed is:

1. In a communications network having a plurality of channel-agile nodes each node capable of transmitting and receiving data over a plurality of shared channels, said shared channels having a first order, a method for enabling a first node and a second node to follow a shared randomized channel-hopping band plan for transmissions to said first node while avoiding channels containing interference, comprising the steps of:

a) assigning to each node a unique seed value that can be used by a pseudo-random number generator to generate a list of channels in pseudo-random order;

b) determining a channel punchout mask for each node, said channel mask indicating in said first order those channels on which that node experiences interference;

c) at said first node, applying said first node's channel mask to a first ordered channel list to eliminate channels on which said first node experiences interference thereby deriving a masked channel list for said first node;

d) at said first node, determining a channel-hopping band plan for receiving transmissions to said first node by ordering the channels in said first node's channel list according to a sequence generated by a pseudo-random number generator seeded with said first node's seed value;

e) transmitting from said first node to said second node an acquisition packet, said acquisition packet including said first node's seed value and said first node's channel mask;

f) at said second node, applying said transmitted channel mask from said first node to said first ordered channel list to eliminate channels on which said first node experiences interference to obtain a masked channel list for said first node at said second node;

g) at said second node, determining a channel-hopping band plan for transmissions to said first node by ordering the channels in said first node's channel list according to a sequence generated by a pseudo-random number generator seeded with said first node's transmitted seed value; and h) thereafter transmitting data to said first node from said second node according to said first node's channel-hopping band plan.

2. The method according to claim 1 wherein said seed values are derived from the addresses of the nodes.

3. The method according to claim 1 wherein said mask is a sequence of bits, each bit having a value of either 0 or 1, where bits of one value correspond to channels in the channel list that are used by the node and bits of the other value correspond to channels in the channel list that are not used by the node and are therefore to be eliminated from the node's channel-hopping band plan.

4. The method according to claim 1 further comprising:

i) storing at each node data from which to determine the masked channel hopping band plan of other nodes in the network to facilitate future data transfers.

5. In a node operable on a communications network having a plurality of shared-medium channels and having a plurality of channel-agile nodes each node capable of transmitting and receiving data over a plurality of said channels, a method for establishing a unique channel-hopping band plan for that node and communicating that band plan to other nodes in the network comprising the steps of:

a) assigning to that node a unique seed value;

b) determining a channel punchout mask, said mask indicating those channels on which the node experiences interference or is otherwise unable to receive data;

c) applying said mask to a list of network channels to eliminate undesirable channels and therefore to obtain a list of available node channels;

d) randomizing said list of available node channels by using a deterministic pseudorandom number generator seeded with said seed value thereby obtaining a unique channel-hopping band plan; and e) communicating said unique channel-hopping band plan to other nodes in the network by transmitting data from which said other nodes may derive said unique channel-hopping band plan.

6. The method according to claim 5 wherein said seed value is derived from an address of the node.

7. The method according to claim 5 wherein said mask is a sequence of bits, each bit having a value of either 0 or 1, where bits of one value correspond to channels in the channel list that are used by the node and bits of the other value correspond to channels in the channel list that are not used by the node and are therefore to be eliminated from the node's channel-hopping band plan.

8. A communications network comprising:

a shared medium with a plurality of channels; and a plurality of intelligent channel-agile nodes wherein each node has the ability of either transmitting on a plurality of channels of said shared medium or receiving on a plurality of channels of said shared medium or both transmitting and receiving on a plurality of channels of said shared medium;

wherein each of said nodes capable of receiving is assigned a seed value and determines a frequency punchout mask for itself from which any node is capable of deriving a unique channel hopping band plan for that node and wherein said band plan is comprised of a random ordering of those network channels on which the node can receive data and wherein the band plans of different nodes in the same communications network are allowed to contain a different number of channels.

9. The method according to claim 5 wherein said data from which said other nodes may derive said unique channel-hopping band plan comprises said unique seed value and said mask.

10. The method according to claim 5 wherein said data from which said other nodes may derive said unique channel-hopping band plan comprises an ordered list identifying said channel-hopping band plan.

* * * * *